June 26, 1934.  J. A. GRAY  1,963,991
VACUUMIZING APPARATUS
Filed Sept. 27, 1930
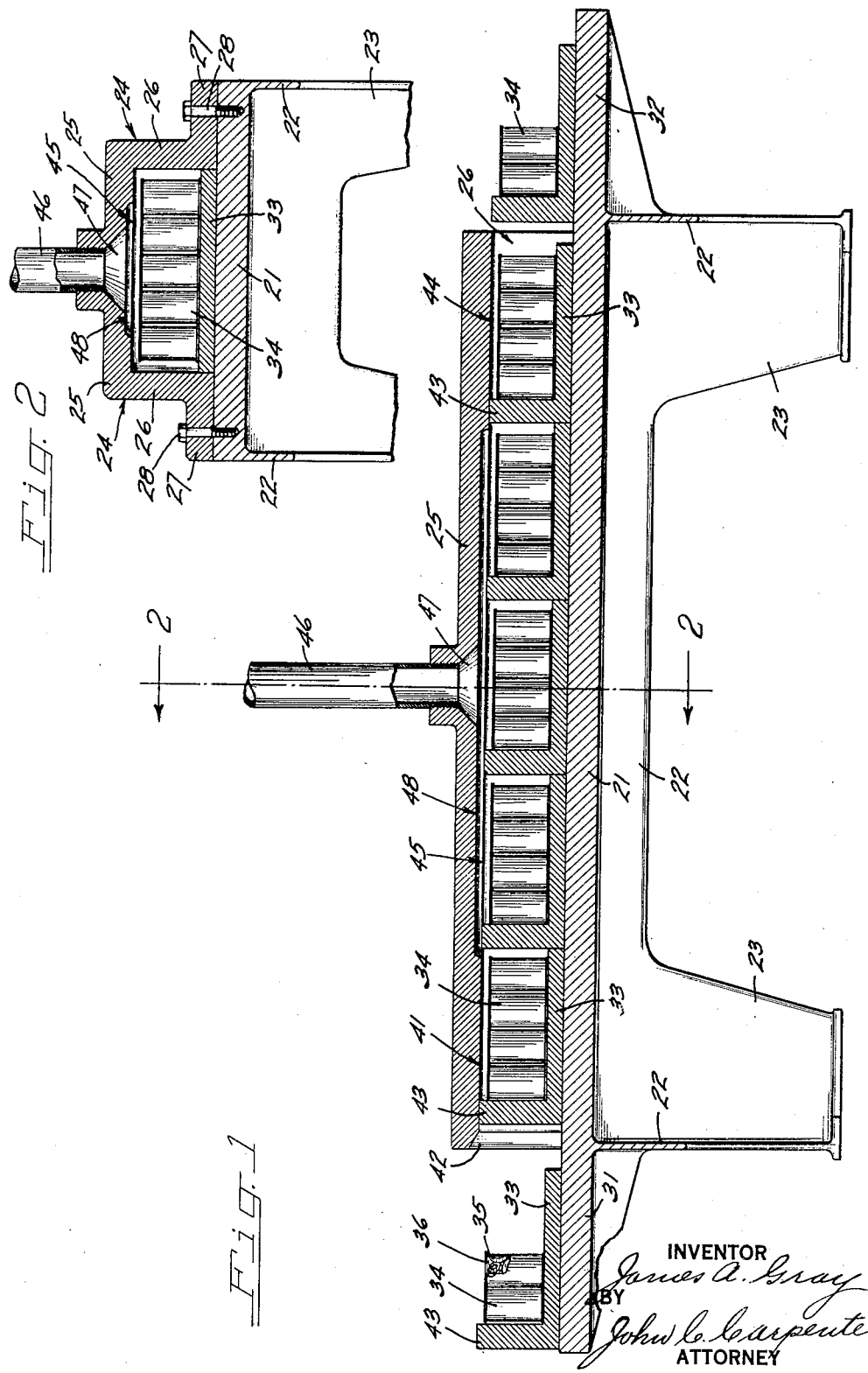
INVENTOR
James A. Gray
BY
John C. Carpenter
ATTORNEY Patented June 26, 1934

1,963,991

UNITED STATES PATENT OFFICE 1,963,991

VACUUMIZING APPARATUS

James A. Gray, San Francisco, Calif., assignor to American Can Company, New York, N. Y., a corporation of New Jersey Application September 27, 1930, Serial No. 484,845

9 Claims. (Cl. 99—2)

The present invention relates to a vacuumizing apparatus and has particular reference to a simplified form of apparatus having a minimum number of parts.

The principal object of the present invention is the provision of an apparatus for vacuumizing articles conveyed in batch lots through a vacuumizing chamber by means of a combined article holder and vacuum seal.

The invention contemplates the use of a series of carriers for a vacuumizing apparatus which are advanced in processional order through a vacuumized chamber which is sealed from the atmosphere by the carriers.

An important object of the invention is the provision of an apparatus for vacuumizing articles in a continuous uninterrupted operation by utilizing carriers for the articles which automatically effect a sealing of the vacuumizing chamber during their passage therethrough.

Numerous other objects of the invention will be apparent as it is better understood from the following description, which, taken in connection with the accompanying drawing, discloses a preferred embodiment thereof.

Referring to the drawing:

Figure 1 illustrates a longitudinal sectional view of a simple form of apparatus for illustrating the present invention; and Fig. 2 is a transverse sectional view taken substantially along the line 2—2 in Fig. 1.

The apparatus, disclosed in the drawing and illustrating an embodiment of a preferred form for carrying out the vacuumizing operation, comprises a horizontal table 21 having cross walls 22 and legs 23. An elongated housing is provided for cooperation with the table 21, this housing comprising a channel member 24 having a flat top wall 25 and side walls 26 and forming an open end tunnel. The side walls 26 are extended outwardly to provide flanges 27 which rest upon the table 21 and are secured thereto by bolts 28.

The table 21 is extended at one end to provide an entrance platform 31 and at its opposite end an exit platform 32. Carriers 33 are utilized for holding and conveying articles to be vacuumized, designated generally by the numeral 34, through the elongated housing. Such articles may be open-ended filled cans, containing fruit or vegetables (indicated by the numeral 35) packed in syrup or other liquid (indicated by the numeral 36) wherein vacuumizing of the can will remove the air from the pores of the product and allow the liquid to permeate into the cells thereof after the filled can is brought out of the vacuumizing chamber into the outside atmosphere.

These articles 34 are preferably placed in batch lots on the carriers 33, as illustrated in the drawing, each such carrier being conveniently filled with the articles when it is resting upon the entrance platform 31 of the table 21. The filled carrier 33 with its required number of cans is then moved into the open end of the tunnel enclosed within the elongated housing. This open or forward end, designated by the numeral 41, is provided with accurately finished smooth walls of predetermined dimension, a tapered face 42 being formed in the face of the channel walls, as illustrated in Fig. 1.

Each carrier 33 is provided with a vertically extending wall 43 which is of accurate dimension, snugly fitting the finished opening 41 of the housing. The carriers 33, while passing through the opening 41, thus substantially close off this end of the tunnel.

Each carrier 33 is moved the full length of the table 21 and throughout the length of the tunnel of the housing member. The walls of the exit end of the housing are likewise accurately finished to predetermined dimensions, this exit end being designated by the numeral 44. Each carrier 33 when inserted into the opening 41 engages a carrier directly in front and forces it and the other carriers ahead, over the table and through the tunnel. The forward carrier 33, as its wall 43 moves slidably within the closely fitting wall 44 of the tunnel, closes off the tunnel at its exit end, and said walls 43 of the carriers do or may form within the tunnel sub-chambers between the carriers.

A vacuum chamber 45 is thus provided interiorly of the tunnel and between the foremost carrier 33 therein and the last carrier. Air is or may be exhausted from this chamber 45 through an exhaust pipe 46 which connects at its air entrance end with an opening 47 formed in the wall 25 of the channel member at a median point of the tunnel and this pipe communicates with any suitable source of vacuum, which may, for example, be a vacuum pump or a vacuum tank (not shown).

The opening 47 communicates with air-exhausting passages such as a longitudinal groove 48 cut in the under face of the wall 25 intermediate the ends 41 and 44 of the tunnel and the sub-chambers between the carriers within the tunnel are brought under the influence of the vacuumized atmosphere by means of such air passages which allows removal of the air surrounding the articles carried by the carrier, past or over the top of the tightly fitting walls 43. With the carriers 33 in the position illustrated in Fig. 1, the articles held in the left hand four carriers illustrated, in the tunnel are under vacuum while the articles in the carrier toward the right and within the opening 44, are cut off from this vacuum.

By reason of the construction of the carrier, which is exceedingly simple and the straight line open-end housing providing the tunnel, articles may be successively and continuously carried through the vacuumizing chamber on the carriers without breaking the vacuum in the chamber, a carrier moving out of the chamber and onto the discharge platform 32 as a similar carrier is being inserted into the entrance end of the tunnel from the platform 31.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a vacuumizing apparatus, the combination of an elongated housing, open at both ends and defining a vacuumizing chamber, and carriers separable from each other and moving into one of said ends and out of the other for conveying articles to be vacuumized through said chamber, said carriers having sealing walls cooperating with the interior walls of said housing during their passage therethrough for sealing the said end openings and completely closing said chamber.

2. In a vacuumizing apparatus, the combination of an elongated housing, open at both ends and defining a vacuumizing chamber, carriers separable from each other and moving into one of said ends and out of the other for conveying articles to be vacuumized through said chamber, said carriers having sealing walls cooperating with the interior walls of said housing during their passage therethrough for sealing the said end openings and completely closing said chamber, and means for vacuumizing said chamber and the articles in said carriers.

3. In a vacuumizing apparatus, the combination of an elongated housing including a table and a channel member superimposed thereon, carriers separable from each other for conveying articles to be vacuumized through said housing and having walls closely fitting within the interior of said housing and movable in successive order over said table, said carrier walls cooperating with said housing to close the vacuum chamber, and means for vacuumizing said chamber and the articles contained therein during the successive passage of said carriers.

4. In a vacuumizing apparatus, the combination of an open-end elongated housing, comprising a horizontal table section partially covered by an inverted U-shape section, the interior of the walls of said housing adjacent said open ends being accurately finished to present smooth surfaces of predetermined dimensions, separable carriers for conveying articles to be vacuumized through said housing, said carriers moving over said table and into said U-shape section and having end walls for accurately fitting the smooth surfaces of the ends of said housing, whereby the carrier while conveying the articles to be vacuumized through said housing also effects a closure for the ends thereof.

5. In a vacuumizing apparatus, the combination of an open-end elongated housing, comprising a horizontal table section partially covered by an inverted U-shape section, interior walls of said housing adjacent said open ends being accurately finished to present smooth surfaces of predetermined dimensions, a series of separable carriers for conveying articles to be vacuumized through said housing, said carriers moving in processional order over said table section and through said U-shape section each carrier having an end wall for accurately fitting the smooth surfaces of the ends of said housing, whereby these ends are closed by the carriers on the forward and rear ends of the processional series of carriers on the table and whereby a closed chamber is formed, and means for vacuumizing said chamber and the articles carried in the said carriers.

6. In a vacuumizing apparatus, the combination of a housing providing a horizontally extending vacuum chamber having an inlet opening, can carriers which are separate so as to be individually handled and which are movable through said chamber and having walls fitting the interior of said chamber to maintain the vacuum, and an air exhaust pipe leading from a median point of said chamber.

7. In a vacuum apparatus, the combination of an entrance platform whereon carriers may be deposited, an exit platform whereon the carriers having exhausted cans may rest, a tunnel open at both ends and extending in a straight line from one of said platforms to the other, separable carriers arranged to propel each other and having a part on which the cans to be exhausted may rest while being transported and having upwardly extending walls which fill said tunnel and resist the entrance of air at the ends of the tunnel, and means for exhausting air from the tunnel, said carriers being separable from each other with the exhausted cans thereon as they emerge from the tunnel.

8. In an apparatus for vacuumizing cans and the like, the combination of a tunnel, can carriers separate from each other so that they can be individually handled and adapted to be passed through said tunnel, walls on said carriers slidably fitting the interior of the tunnel, and an exhaust pipe leading from a median point of the tunnel.

9. In an apparatus for vacuumizing cans and the like, the combination of a tunnel, can carriers separate from each other so that they can be individually handled and adapted to be passed through said tunnel, walls on said carriers slidably fitting the interior of the tunnel, and an exhaust pipe leading from a median point of the tunnel, said tunnel having air exhausting passages leading from end portions of the tunnel to said median point.

JAMES A. GRAY.